United States Patent
Kresina et al.

(10) Patent No.: US 6,561,425 B2
(45) Date of Patent: May 13, 2003

(54) SYSTEM AND APPARATUS FOR GENERATING A UNIQUE IDENTITY FOR A COMPUTER-BASED PRODUCT

(75) Inventors: Roman Kresina, Oxford, CT (US); George Brookner, Norwalk, CT (US)

(73) Assignee: Ascom Hasler Mailing Systems Inc., Shelton, CT (US)

( * ) Notice: Subject to any disclaimer, the term of this patent is extended or adjusted under 35 U.S.C. 154(b) by 0 days.

(21) Appl. No.: 09/683,436

(22) Filed: Dec. 28, 2001

(65) Prior Publication Data

US 2003/0057281 A1 Mar. 27, 2003

Related U.S. Application Data

(60) Provisional application No. 60/325,313, filed on Sep. 26, 2001.

(51) Int. Cl.[7] .................................................. G06K 7/10
(52) U.S. Cl. ............................. 235/462.01; 235/462.01; 235/101; 364/466; 364/900; 380/21; 380/25; 380/30; 380/51; 380/55
(58) Field of Search ............................ 235/462.01, 101; 364/466, 900; 380/21, 25, 30, 51, 55

(56) References Cited

U.S. PATENT DOCUMENTS 5,712,787 A * 1/1998 Yeung ........................ 705/10
5,845,265 A * 12/1998 Woolston ..................... 705/37
6,427,032 B1 * 7/2002 Irons et al. ................. 382/306

* cited by examiner

Primary Examiner—Karl D. Frech
Assistant Examiner—Kim Nguyen
(74) Attorney, Agent, or Firm—Oppedahl & Larson LLP

(57) ABSTRACT

Computer-based products such as postal security devices are manufactured as generic, nondescript units. Each has a unique identifier or embedded hardware serial number readable by data communications such as serial electrical communications. At customization time, a human-readable marking is placed on the device, along with a bar code indicative of the human-readable marking. A bar-code reader reads the bar code. The embedded hardware serial number is read. A record is made in a database indicative of the embedded hardware serial number and the bar code information. Software may then be selected based on the bar code information, and loaded into the device, typically within a cryptographically secure area within the device. At a later time the device may be retired from service and reprogrammed, in which case a new human-readable marking and bar code are affixed to the device. The embedded hardware serial number and new bar code information are read and appropriate new data records are created. The data records may further contain information regarding cryptographic keys loaded into the device and version levels of software within the device. In this way a generic device may be customized and efficiently managed.

7 Claims, 3 Drawing Sheets

SYSTEM AND APPARATUS FOR GENERATING A UNIQUE IDENTITY FOR A COMPUTER-BASED PRODUCT

CROSS REFERENCE TO RELATED APPLICATIONS

This application claims priority from U.S. application Ser. No. 60/325,313 filed Sep. 26, 2001.

BACKGROUND OF INVENTION

In recent years, some postal authorities have proposed that systems for printing postage (franking systems) should use so-called "postal security devices." Each postal security device typically consists of a printed circuit board, a power supply, an anti-tampering shield, and a housing or enclosure. A cryptographic boundary is defined, within which is located a real-time clock. These parts when assembled are permanently sealed, for example in epoxy resin. The postal security device or PSD is configured and placed into service.

Designers of postage meters (franking machines) and would-be designers of PSDs have typically chosen configuration steps which include embedding a unique serial number into the device which will never change again, and which is used for a number of purposes including tracking of units and management of cryptographic keys.

A variety of prior-art approaches have been attempted. In U.S. Pat. No. 4,506,329 to Duwel et al. ("Duwel") there is described a device in which a bit in memory is used to indicate whether a one-time-only serial number has already been stored in memory. Software in the device is designed to check the contents of the bit. If the bit is set, the software will not permit further changes of the memory. This approach has a drawback in that it is necessary to know what serial number is desired at the time the bit is to be set. The device does not permit changing a serial number at a later time, for example if a device is to be reused. Even if such a device were modified to permit changing a serial number at a later time, a consequence would be that the previous serial number would be lost, which is disadvantageous.

U.S. Pat. No. 4,525,786 to Crowley et al. describes a device in which the setting of a serial number is linked to setting predetermined values in other memory locations, specifically ascending and descending registers in a postage meter. This, too, has some of the same drawbacks as Duwel, for example the problem that the serial number cannot later be changed even if a device is to be reused.

U.S. Pat. No. 4,424,573 to Eckert, Jr. et al. discloses a device having a "chip number" and a distinct "serial number." The serial number is stored in nonvolatile memory in the device in a way that replaces the chip number. This again has the potential drawback that the chip number is lost when the serial number overwrites it.

U.S. Pat. No. 5,742,682 to Baker et al. shows a system in which a "unique secure box identification" is stored in a box. In U.S. Pat. No. 5,680,456 to Baker et al. there is described a "unique device identifier" that is programmed into a device.

All of these past approaches have potential drawbacks. These approaches typically assume that a device is purpose-built for a particular specific application. They typically assume that a unique identifier, once programmed into a device, will not subsequently change. They further typically assume that a device would not be a generic nondescript unit capable of being configured one way and at a later time being configured in a different way.

Purpose-built devices have an additional potential drawback that they must be inventoried according to their purpose. Such inventorying is costly and takes up space.

It would be extremely desirable to devise a system permitting the manufacture of generic nondescript units, which could then be configured for particular applications. Such a system would require unique identification of the generic units, but would also require a versatile way of identifying units according to the applications for which they are configured. Finally, such a system would ideally have not only identifiers stored within the units (which are not readily human-readable) but would also have identifiers perceptible from outside the unit, by characters or bar coding or the like, all integrated with the rest of the system.

SUMMARY OF INVENTION

Computer-based products such as postal security devices are manufactured as generic, nondescript units. Each has a unique identifier or embedded hardware serial number readable by data communications such as serial electrical communications. At customization time, a human-readable marking is placed on the device, along with a bar code indicative of the human-readable marking. A bar-code reader reads the bar code. The embedded hardware serial number is read. A record is made in a database indicative of the embedded hardware serial number and the bar code information. Software may then be selected based on the bar code information, and loaded into the device, typically within a cryptographically secure area within the device. At a later time the device may be retired from service and reprogrammed, in which case a new human-readable marking and bar code are affixed to the device. The embedded hardware serial number and new bar code information are read and appropriate new data records are created. The data records may further contain information regarding cryptographic keys loaded into the device and version levels of software within the device. In this way a generic device may be customized and efficiently managed.

BRIEF DESCRIPTION OF DRAWINGS

The invention will be described with respect to a drawing in several figures, of which.

DETAILED DESCRIPTION

Figure 1:
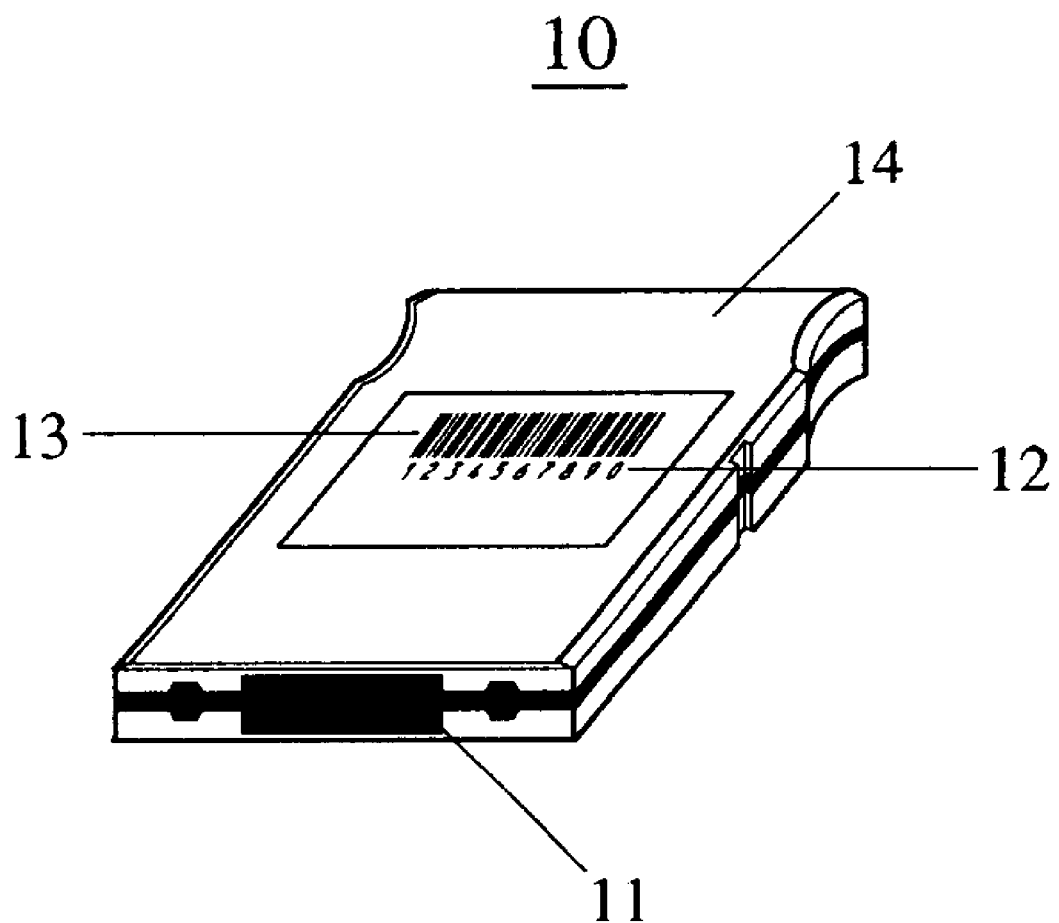
FIG. 1 is a perspective view of a postal security device according to the invention.

Turning first to FIG. 1, what is shown is a perspective view of a postal security device according to the invention. The PSD 10 has a housing 14, a human-readable marking 12, and a corresponding bar code 13. A port 11, typically an electrical connector, permits communication with circuitry within the PSD. (The port 11 could use non-electrical communication such as an infrared link in addition to electrical connections.) The housing 14 obscures any view of electronic components therewithin.

Figure 2:
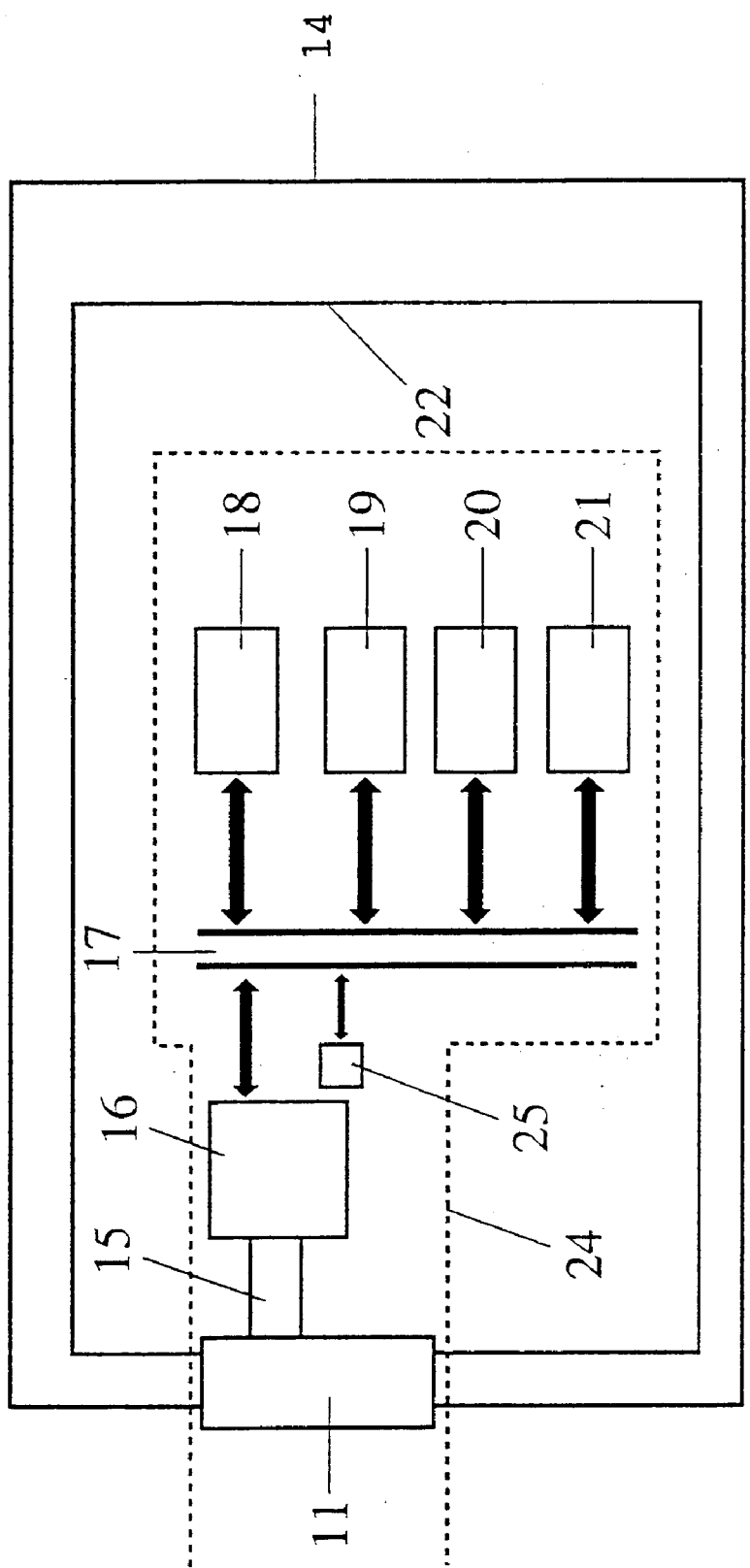
FIG. 2 is a functional block diagram of an exemplary device of FIG. 1.

FIG. 2 is a functional block diagram of an exemplary PSD 10. Within housing 14 is an anti-tampering shield 22. Within the anti-tampering shield 22 are typically a processor 18, volatile memory 19, nonvolatile memory 20, and a cryptographic engine 21. A real-time clock 25 is a convenient place for a embedded hardware serial number. The aforementioned devices communicate via a bus 17 which, for security reasons, is preferably not accessible outside of the housing 14. An I/O block 16 mediates communication between port 11 and the aforementioned devices. The I/O block 16 is connected with port 11 by wiring or other conductors 15. The components within the shield 22, together with other cryptographic resources external to the device 10, define a cryptographic boundary 24. All crucial data communications during the life of the device 10 are contained within the cryptographic boundary 24.

Those skilled in the art will appreciate that while a single cryptographic boundary 24 is shown in the figure for clarity, in functioning systems it may be convenient to have a plurality of cryptographic boundaries defined by corresponding cryptographic keys, so that various external devices may have varying scopes of action within the PSD 10.

Figure 3:
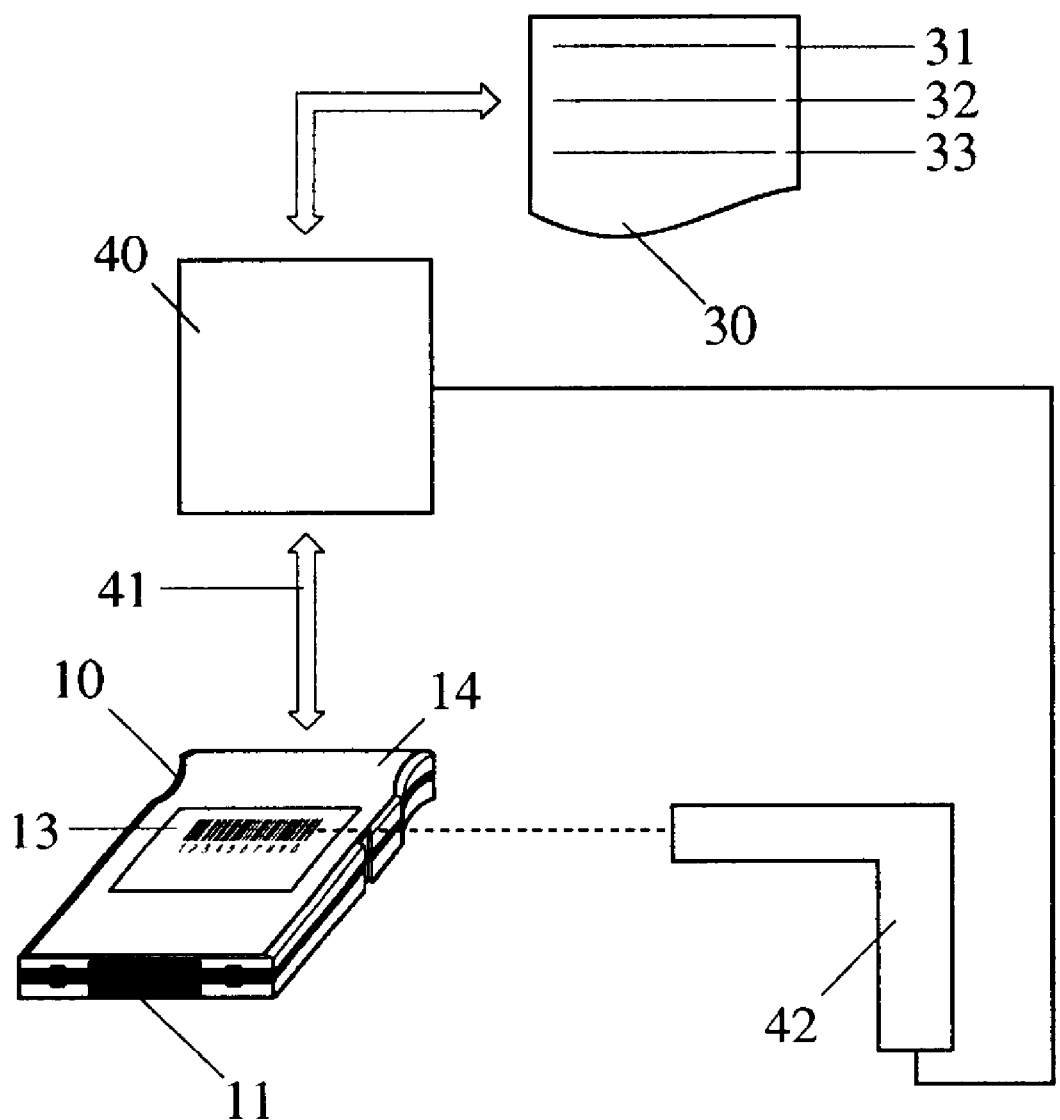
FIG. 3 is a functional block diagram of a system configuring the device of FIG. 1 and an associated database. Where possible, like reference numerals have been used in the figures to denote like elements.

FIG. 3 is a functional block diagram of a system 50 configuring the device 10 of FIG. 1 and an associated database 30. A connecting cable 41 such as an RS-232 serial cable connects with or is networked to a host computer 40 with port 11 of PSD 10. With appropriate protocols the host 40 may read various data from the PSD 10 including the embedded hardware serial number, and may write various data including cryptographic keys, register settings, and software sets to memory within the PSD, omitted for clarity in FIG. 3.

Importantly, a bar code reader 42 is connected with the host 40 and may be positioned to read the bar code 13. As described in more detail below, computations take place within the host 40, and data records 31, 32, 33 are written to a database 30. These records associate embedded hardware serial numbers with human-readable identifiers and optionally with other data including cryptographic keys and software version numbers.

In this way, the system inexorably links what may be a randomly chosen identification number and the initial identification of a PSD and its entry into a key management system (KMS) in preparation for a customization manufacturing process. The PSDs each have a unique identifier or embedded hardware serial number. Importantly, no assumptions are made regarding the embedded hardware serial number other than its being unique. The embedded hardware serial numbers may be assigned in order (i.e. serially) but nothing about the invention requires such a sequence, and indeed any assignment procedure that preserves uniqueness will permit the benefits of the invention to be enjoyed.

The PSD is a postage funds vault following design procedures per FIPS PUB 140-1, regarding security aspects of the device. In an exemplary embodiment, the device consists of a printed circuit board, a power supply, an anti-tampering shield and an enclosure. The circuit board has within its cryptographic boundary a real-time clock and the clock is a convenient place to store a unique identification ("embedded hardware serial number"). These parts when assembled are permanently sealed ("potted") for example with epoxy within the enclosure. The printed circuit board will, during customization, have its memory chips and microprocessor programmed to function as a secure postage funds containment and dispensing device. Therefore, it becomes necessary to identify the assembled device as a unique, one-of-a-kind entity, while what exists prior to customization is a generic, non-descript unit. Stated differently, many thousands of such generic assemblies may be built, but prior to customer use they must each be uniquely identifiable from all other units.

The step of affixing a human-readable label to the PSD will now be discussed in some detail. In the simplest embodiment, a set of labels is prepared, for example by printing, each label carrying a human-readable identification number as well as a bar code representing at least the identification number. Alternatively, the human-readable identification number and bar code may be silk-screened to a face of the PSD. A bar code reader is used as described above to read such bar codes.

At customization time, the bar code is scanned (optically), and the embedded hardware serial number is read (typically electrically). The host verifies that the human-readable identifier is not already in the database. The host then writes a new record in the database for the new PSD identification number which now links the bar code of the enclosure to the serial number of the electronics.

In the case where a PSD is to be retired from service and rebuilt or reprogrammed, a new label may be affixed in place of a previous label. Alternatively, the old label may be physically removed and a new label affixed in its place. In the case where old silk-screened markings have been employed, a new label may be affixed to cover the old markings.

In such a case, the new identification number is linked to the embedded hardware serial number, and the device is again uniquely distinguished and disambiguated from all other PSDs. The original PSD identification number is retired to an archive.

Those skilled in the art will appreciate that the step of removing a record from the database may be achieved by literally removing the record. Other database steps will, however, accomplish the same result and are encompassed herein. For example, the record may be preserved in the database but with a field or flag set to indicate that the record represents a PSD that no longer exists. As another example, the record may be transferred to an archive representing PSDs removed from service.

While this description refers to an "identification number," those skilled in the art will appreciate that any expression capable of satisfying uniqueness may be used. Decimal numbers may be used, but hexadecimal numbers would serve as well, and unique strings including alphabetic characters may also be employed without deviating from the invention.

The embedded hardware serial number (sometimes called a "first unique identifier") deserves further comment. To assure uniqueness, the embedded hardware serial number may be assigned from an established address space. For example, the media access control (MAC) address space defined for ethernet devices may be employed for this purpose.

It should be appreciated that the apparatus and method described herein are particularly well suited to management of cryptographic keys. Thus, when a database record is created that links the embedded hardware serial number with the human-readable identification number, it is advantageous to use this record (or records in another database linked to this record) to keep track of the cryptographic key or keys stored in the device.

It should also be appreciated that the apparatus and method described herein are well suited to version control, such as keeping track of the software version of code stored in the device. Thus, when a database record is created that links the embedded hardware serial number with the human-readable identification number, it is advantageous to use this record (or records in another database linked to this record) to keep track of the version level of code in the device. Where several bodies of code are stored in the device, these records are preferably used to keep track of the version numbers for the respective bodies of code.

The system provides the ability, then, to denote a configuration and/or model type of designation in the bar code. For example, the bar code may permit identifying an appropriate software program for downloading into the device.

The not-yet-customized generic PSDs may be manufactured to provide any of a number of hardware sets. For example, the nature of the microprocessor and ancillary components within the cryptographic boundary of the PSD may mean that the PSD can only accept certain software and not others. For example, a particular PSD may configured to provide a very high speed cryptographic signature generator and include several cryptographic processors. The bar code may then contain a "model number" portion which is compared (in host 40) with the actual internal configuration of the PSD. Assuming the comparison is favorable, then the appropriate software is loaded into the PSD. If, on the other hand, the internal configuration does not match the "model number" portion of the bar code, then the likely explanation is that the wrong bar code was affixed to the PSD. In such a case the failure to match is annunciated to a human user. Customization halts until the errant PSD has an appropriate new bar code affixed. Again the bar code and embedded hardware serial number are checked, and if the internal configuration matches the requisite information in the bar code, then the correct software is loaded.

It will be appreciated that once the decision is made to affix a bar code to a PSD as described herein, additional benefits may be derived as the method is carried out. For example any of a number of options or conditions or configurations may be communicated by the bar code. As another example, the bar code could be two-dimensional and of high density. This permits conveying significant amounts of data or even program code for inclusion into the loading of software into the PSD when it is being configured or customized. The bar code could be encrypted (to hide information) or could be digitally signed to authenticate the data in the bar code.

The invention is described with respect to a postal security device, such devices being particularly well suited to benefit from the invention for reasons described above. The invention might well have application, however, to any generic computer product that requires an identification that uniquely corresponds to the software therein. Those skilled in the art will have no difficulty devising myriad variations and obvious improvements, all of which are intended to be encompassed within the scope of the claims which follow.

What is claimed is:

1. A method for use with a database and with a postal security device, the postal security device comprising a housing, an anti-tampering shield within the housing, a volatile memory within the anti-tampering shield, a clock within the anti-tampering shield, said clock comprising a first unique identifier, a processor within the anti-tampering shield, and a nonvolatile memory within the anti-tampering shield, the method comprising the steps of:

affixing a first human-readable marking to the exterior of the housing, said first marking comprising a first human-readable identification number and a first bar code indicative of the first identification number;

reading the first bar code and determining the first identification number;

reading the first unique identifier;

checking the database for presence of the first identification number therein, and in the event of the first identification number being absent from the database, writing a first record in the database linking the first unique identifier with the first identification number;

affixing a second human-readable marking to the exterior of the housing, said second human-readable marking being non-identical to the first human-readable marking, said second human-readable marking comprising a second human-readable identification number and a second bar code indicative of the second identification number;

reading the second bar code and determining the second identification number;

reading the first unique identifier;

removing the first record from the database; and checking the database for presence of the second identification number therein, and in the event of the second identification number being absent from the database, writing a second record in the database linking the first unique identifier with the second identification number.

2. The method of claim 1 wherein the step of writing a first record further comprises storing information indicative of a cryptographic key stored within the device.

3. The method of claim 1 wherein the step of writing a first record further comprises storing information indicative of a version level of software stored within the device.

4. A method for use with a database and with a postal security device, the postal security device comprising a housing, an anti-tampering shield within the housing, a volatile memory within the anti-tampering shield, a clock within the anti-tampering shield, said clock comprising a first unique identifier, a processor within the anti-tampering shield, and a nonvolatile memory within the anti-tampering shield, the method comprising the steps of:

affixing a first human-readable marking to the exterior of the housing, said first marking comprising a first human-readable identification number and a first bar code indicative of the first identification number;

reading the first bar code and determining the first identification number;

reading the first unique identifier; and checking the database for presence of the first identification number therein, and in the event of the first identification number being absent from the database, writing a first record in the database linking the first unique identifier with the first identification number.

5. The method of claim 4 further comprising the steps of:

affixing a second human-readable marking to the exterior of the housing, said second human-readable marking being non-identical to the first human-readable marking, said second human-readable marking comprising a second human-readable identification number and a second bar code indicative of the second identification number;

reading the second bar code and determining the second identification number;

reading the first unique identifier;

removing the first record from the database; and checking the database for presence of the second identification number therein, and in the event of the second identification number being absent from the database, writing a second record in the database linking the first unique identifier with the second identification number.

6. A method for use with a database and with a postal security device, the postal security device comprising a housing, an anti-tampering shield within the housing, a volatile memory within the anti-tampering shield, a clock within the anti-tampering shield, said clock comprising a first unique identifier, a processor within the anti-tampering shield, and a nonvolatile memory within the anti-tampering shield, the device having an internal configuration, the method comprising the steps of:

affixing a first human-readable marking to the exterior of the housing, said first marking comprising a human-readable identification number and a bar code indicative of the identification number;

reading the bar code and determining the identification number;

reading the first unique identifier; and checking for compatibility between the identification number and the internal configuration of the device, and in the event of a failure of compatibility, annunciating said failure to a human user.

7. A method for use with a database and with a postal security device, the postal security device comprising a housing, an anti-tampering shield within the housing, a volatile memory within the anti-tampering shield, a clock within the anti-tampering shield, said clock comprising a first unique identifier, a processor within the anti-tampering shield, and a nonvolatile memory within the anti-tampering shield, the device having an internal configuration, the method comprising the steps of:

affixing a first human-readable marking to the exterior of the housing, said first marking comprising a human-readable identification number and a bar code indicative of the identification number;

reading the bar code and determining the identification number;

reading the first unique identifier; and checking for compatibility between the identification number and the internal configuration of the device, and in the event of compatibility, loading first software into the device, said first software selected from among a plurality of items of software, said first software selected responsive to information contained within the bar code.

* * * * *

UNITED STATES PATENT AND TRADEMARK OFFICE
CERTIFICATE OF CORRECTION

PATENT NO. : 6,561,425 B2
DATED : May 13, 2003
INVENTOR(S) : Kresina et al.

It is certified that error appears in the above-identified patent and that said Letters Patent is hereby corrected as shown below:

Title page,
Item [56], References Cited, U.S. PATENT DOCUMENTS, add:
-- 5,680,456   10/1997     Baker, et al.
   4,424,573    1/1984      Eckert, Jr., et al.
   4,525,786    6/1985      Crowley, et al.
   5,742,682    4/1998      Baker, et al.
   4,506,329    3/1985      Duwel, et al. --

Signed and Sealed this

Twenty-sixth Day of August, 2003

JAMES E. ROGAN
*Director of the United States Patent and Trademark Office*